US009287978B2

(12) United States Patent
Heine et al.

(10) Patent No.: US 9,287,978 B2
(45) Date of Patent: Mar. 15, 2016

(54) SYSTEM AND METHOD FOR COMMUNICATION BETWEEN TWO COMMUNICATION PLATFORMS

(75) Inventors: Frank Heine, Mainhardt (DE); Thomas Alberty, Backnang (DE); Stefan Seel, Murrhardt (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 214 days.

(21) Appl. No.: 13/614,190

(22) Filed: Sep. 13, 2012

(65) Prior Publication Data

US 2013/0064551 A1    Mar. 14, 2013

(30) Foreign Application Priority Data

Sep. 14, 2011    (DE) .......................... 10 2011 113 148

(51) Int. Cl.
*H04B 10/00* (2013.01)
*H04B 10/118* (2013.01)

(52) U.S. Cl.
CPC .................................. *H04B 10/118* (2013.01)

(58) Field of Classification Search
CPC ......... H04B 10/00; H04B 10/06; H04J 14/02; G01S 13/08
USPC .................................................. 398/121–125
See application file for complete search history.

(56) References Cited

U.S. PATENT DOCUMENTS

| | | | | |
|---|---|---|---|---|
| 5,272,559 A * | 12/1993 | Hui Bon Hoa | .......... | H04L 27/14 398/203 |
| 5,347,529 A * | 9/1994 | Noe | ...................... | H03F 1/3252 330/149 |
| 5,392,377 A * | 2/1995 | Auracher | ............ | H01S 3/06754 372/4 |
| 6,181,450 B1 * | 1/2001 | Dishman | ............ | G04B 7/18521 370/281 |
| 6,297,897 B1 | 10/2001 | Czichy et al. | | |
| 6,486,958 B1 * | 11/2002 | Szafraniec | ................ | G01J 9/04 250/227.23 |
| 6,570,695 B1 * | 5/2003 | Pribil | ................... | H04B 10/118 398/121 |
| 6,778,779 B1 * | 8/2004 | Shay | .................. | H04B 10/2587 398/120 |
| 6,782,212 B2 * | 8/2004 | Tsao | .................... | H04B 10/118 398/115 |
| 7,020,106 B2 * | 3/2006 | Barnard | ............. | H04L 12/5692 370/278 |
| 7,406,269 B2 * | 7/2008 | Becker | ................ | H04B 10/616 398/203 |
| 2002/0181059 A1 * | 12/2002 | Christopher | ......... | H04B 10/118 398/121 |
| 2004/0161239 A1 | 8/2004 | Bruesselbach et al. | | |
| 2004/0208602 A1 * | 10/2004 | Plante | ................ | H04B 10/1125 398/140 |
| 2007/0133993 A1 * | 6/2007 | Yee | ........................ | H04B 10/50 398/85 |
| 2008/0025728 A1 * | 1/2008 | Shpantzer | ............ | H04B 10/118 398/104 |
| 2008/0145063 A1 * | 6/2008 | Li | .......................... | H04B 10/40 398/140 |
| 2009/0028573 A1 * | 1/2009 | Krill | .................... | H04B 10/118 398/125 |
| 2009/0053995 A1 * | 2/2009 | Moore, III | ......... | H04B 7/18521 455/13.1 |
| 2009/0269082 A1 * | 10/2009 | Pruszenski | ........... | H04B 10/572 398/204 |
| 2012/0146834 A1 * | 6/2012 | Karr | ...................... | G01S 13/325 342/47 |

FOREIGN PATENT DOCUMENTS

| | | |
|---|---|---|
| DE | 10 2005 000 937 A1 | 7/2006 |
| DE | 10 2008 019 066 A1 | 10/2009 |
| DE | 10 2008 005 791 B3 | 11/2009 |

* cited by examiner

*Primary Examiner* — David Payne
*Assistant Examiner* — Pranesh Barua
(74) *Attorney, Agent, or Firm* — Crowell & Moring LLP

(57) ABSTRACT

A system for communication between two communication platforms, including a near-earth returning platform and a remote platform. A bidirectional asymmetrical communication link is set up between the two platforms.

18 Claims, 6 Drawing Sheets

SYSTEM AND METHOD FOR COMMUNICATION BETWEEN TWO COMMUNICATION PLATFORMS

CROSS-REFERENCE TO RELATED APPLICATIONS

The present application claims priority under 35 U.S.C. §119 to German Patent Application No. 10 2011 113 148.9, filed Sep. 14, 2011, the entire disclosure of which is herein expressly incorporated by reference.

BACKGROUND AND SUMMARY OF THE INVENTION

The present invention relates to a system for communication between two communication platforms and a method for communication between two communication platforms. In particular, the present invention relates to a communication between a near-earth returning platform (ezP) and a remote platform (eS). In addition, the present invention relates to a system and a method for communication between these two communication platforms using a bidirectional asymmetrical communication link.

Various communication methods are currently known for establishing and maintaining a communication link between communication platforms. In particular mobile communication platforms, for example, communication platforms embodied as vehicles, such as aircraft and satellites, use wireless communication links largely due to the relative mobility of the communication platforms. Such communication links may use electromagnetic waves, for example, and may be embodied as radio communication links or optical transmission methods, for example, using laser light of a defined wavelength.

There are known methods for communication between satellites in the same orbits (LCTSX) and/or in different orbits (EDRS, SPOT4 ARTEMIS), between satellites and manned aircraft (ARTEMIS FALCON), unmanned aerial vehicles or UAVs (LCT UAV) and between a satellite and a ground station on the earth's surface (ARTEMIS OGS, LCTSX OGS).

Corresponding communication methods enable a transfer of information between the individual communication platforms. These known communication methods have in common the fact that the methods and/or the communication links they use are designed to be symmetrical as such. In other words, the methods used are identical in the principles used, in particular with respect to the type of modulation and/or the data rate implemented in a first link and/or a first partial communication connection, for example, an uplink between a near-earth platform and a satellite as well as, in a second link or a second partial communication connection, a downlink between a satellite and a near-earth platform, for example.

It should be noted, however, that the communication channel between two such platforms, for example, between a near-earth platform and a satellite, is not itself designed to be symmetrical. To this extent, it may appear advantageous to adjust the communication link between two platforms to the possible asymmetry of a communication channel to a greater extent.

Thus, exemplary embodiments of the present invention provide a communication link adapted to the specific requirements of communication between two communication platforms. This may be, for example, a laser communication link between a satellite and a near-earth platform (e.g., a returning platform). The satellite or the remote platform may be a platform for operation outside of the earth's atmosphere, in particular in a Low Earth Orbit (LEO) or a geostationary orbit (GEO), while the near-earth platform, in particular a returning platform, is a platform for operation in the earth's atmosphere or at the border thereof, in particular an aircraft, more specifically an airplane. The use of additional aircraft such as airborne vehicles resembling balloons or zeppelins or the like is also conceivable.

It is particularly advantageous to use different types of signal modulation that permits an effective and broadband bidirectional communication link between a remote platform and a near-earth returning platform. To do so, different types of communication may be adapted to the asymmetry of the transmission channel between the remote platform and the near-earth returning platform.

When a different type of communication is mentioned within the context of the present invention, this should not be understood to mean an exclusive differentiation into a possible and/or implemented data rate that instead should be based on a difference in the technical implementation of each partial communication link, for example, using different types of signal modulation and/or transmission methods, although these may ultimately lead to different data rates as a result.

Thus, within the scope of the present invention, an asymmetrical communication link is based on a different type of communication and/or on a different communication method for each partial communication link, in particular not being based on a different data rate of the respective partial communication link with the same type of communication and/or with the same communication method.

The communication link between two communication platforms should thus be implemented as a bidirectional asymmetrical communication link by using different types of communication and/or transmission methods for a first partial communication link and a second partial communication link.

According to the present invention, special aspects of laser communication between a satellite and a near-earth returning platform in this context are related to a near-earth returning platform with special consideration of the special features of laser communication through the earth's atmosphere and/or between the earth's atmosphere and outer space, in particular taking into account the costs and efficiency for a laser communication terminal (LCT) installed in satellites in outer space as well as the corresponding costs and complexity for a laser communication terminal.

According a system for communication between two communication platforms, a method for communication between a near-earth returning platform and a remote platform as well as the near-earth returning platform itself and a remote platform are disclosed.

According to one exemplary embodiment of the present invention, a system for communication between two communication platforms is provided, having a near-earth returning platform (ezP) and a remote platform (eS), such that a communication link is established between these two platforms, the communication link being embodied as a bidirectional asymmetrical communication link.

According to another exemplary embodiment of the present invention, a method for communication between a near-earth returning platform and a remote platform is provided, comprising communication between the near-earth returning platform and the remote platform using a bidirectional asymmetrical communication link.

According to another exemplary embodiment of the present invention, a near-earth returning platform is provided, which is designed for communication with a remote platform using a bidirectional asymmetrical communication link.

According to another exemplary embodiment of the present invention, a remote platform is provided, which is designed for communication with a near-earth returning platform using a bidirectional asymmetrical communication link.

According to one aspect of the present invention a laser communication terminal (LCT) is installed on both the remote satellite platform and the near-earth returning platform. The laser communication terminal of the remote platform may have at least the particularly efficient reception method of heterodyne reception as well as having at least the transmission method of amplitude modulation. Furthermore, the laser communication terminal of the near-earth returning platform may supply at least the transmission method of heterodyne reception as well as at least supplying the reception method of amplitude modulation.

In this context heterodyne reception may be understood to refer to optical heterodyne reception as well as homodyne optical heterodyne transmission with phase modulation.

The communication method according to the present invention, amplitude modulation reception of the near-earth returning platform and heterodyne reception of the remote platform offers advantages of ideally designing and using the respective transmission units of the other platform, based on the communication channel between the near-earth returning platform and the remote platform.

The emission of a laser beam of the transmission unit of the near-earth returning platform in the direction of the remote platform is first disturbed by the atmosphere because it is assumed that the near-earth returning platform operates inside the earth's atmosphere. However, outside of the earth's atmosphere, i.e., above the Kármán line, the wavefront of the laser beam is actually improved due to the further propagation of the laser beam in outer space, where there is no air, because atmospheric interference in general is local and on a small scale, and therefore such interference is deflected out of the laser beam in further propagation until it is received at the remote platform. The wavefront received by the remote satellite platform is thus essentially free of interference and is therefore suitable for coherent reception.

In the opposite case, i.e., transmission from the remote platform to the near-earth returning platform, the laser beam of the remote platform initially undergoes interference-free propagation through outer space but is possibly subject to interference on the last portion of its path, i.e., the last kilometers through the earth's atmosphere. Reception based on amplitude modulation, however, is insensitive to phase front interference, such as that caused by the earth's atmosphere, for example, and may thus be implemented even with reception lenses of a lower quality and thus of a lower cost as well.

The communication method according to the present invention thus uses heterodyne reception in the uplink between a near-earth returning platform and a remote platform, in particular phase modulation, while using amplitude modulation in the downlink between the remote platform and the near-earth returning platform.

The transmission method is thus asymmetrical with respect to uplink and downlink in use of the respective transmission method. At the same time this results in a lower data rate in downlink than in uplink by a factor of essentially 10 because a higher data rate, e.g., in the range of 2 to 6 Gbit/s in particular 2.8 Gbit/s can be achieved when using phase modulation in the uplink in comparison with a data rate of 100 to 200 Mbit/s in downlink. At the same time the transmission power used can be adjusted in accordance with the respective platform. Thus, the remote platform, for example, may use a power in the range of 1 to 5 W, for example, 1.5 W for communication while the near-earth returning platform may transmit in the range of 20 to 30 W.

The present invention is thus particularly, but not exclusively, suitable for information collecting platforms of the near-earth returning platform that may be forwarded to another station by using the remote platform as a relay station. The additional station here may be a satellite ground station, for example, or another remote platform, i.e., another satellite which also operates as a relay station and thus increases the possible range of the data transmission, for example, by a downlink there to a ground station, which could not be reached by the actual remote platform connected to the near-earth returning platform.

The near-earth returning platform may be, for example, an unmanned aerial vehicle (UAV), which in turn collects information, e.g., image information about the earth's surface, by means of various detectors and/or camera systems. The volumes of data thereby generated, possibly enormous volumes of data, are sent to the remote platform for further distribution and/or forwarding by uplink, which is fast in comparison with downlink. This connection may be implemented here essentially permanently online or also with interruptions.

The near-earth returning platform may thus in turn store the collected information temporarily and relay it only on an individual case basis, for example, when a communication link is established with the remote platform.

One possible scenario here might be that a plurality of near-earth returning platforms operates in a similar region and the respective information collected is to be forwarded at certain points in time to the remote platform. Thus, a plurality of near-earth returning platforms can be operated from one remote platform. Necessary repositioning of at least the laser terminal on the remote platform in relation to a certain UAV may be assumed to be a known process in this context and will not be explained further here.

Communication devices on the remote platform, for example, a laser communication terminal on a satellite may be especially optimized with respect to power consumption, sensitivity of a receiver, weight and space required, for example, due to the given factors of use in outer space. The development and use of highly efficient but complex reception units are necessitated by the expected long operating times without maintenance, for example, 8 years or 15 years for low-earth orbit platforms or geostationary platforms.

Optical heterodyne reception, in particular homodyne optical heterodyne reception with phase modulation may be regarded here as one of the most sensitive and efficient reception methods. In other words, in heterodyne reception the smallest number of received photons may allow detection of a received bit. For example, for a heterodyne reception element, nine photons may be suspicious per bit at a bit error rate of $10^{-9}$. Other optical communication methods may require a greater number of photons per bit by a factor of at least 2, which would necessitate a larger reception aperture, which at the same time would also increase the weight of a laser communication terminal at the remote platform.

Optical heterodyne reception may be assumed to be especially free of interference because it is not subject to interference due to sunlight or due to controlled exposure to laser light that does not correspond exactly to the frequency and direction of the transmission unit of the additional laser communication terminal. Reception by one laser communication terminal located on a near-earth returning platform and/or the information thereby transmitted in the uplink to the laser communication terminal of the remote platform may also be ensured in possible interference measures through the use of the type of communication and/or the communication method of homodyne transmission.

A laser communication terminal of a remote platform that has the transmission methods of amplitude modulation communication as well as heterodyne communication may also be capable of communicating with a near-earth returning platform as well as with additional remote platforms, for example, an earth observation satellite or even more remote relay stations at a high data rate by means of coherent transmission and reception methods while at the same time maintaining a near-earth returning platform adapted to its specific requirements, for example, being smaller, lighter, serviceable and less expensive.

A laser communication terminal on a near-earth returning platform may require fundamentally different boundary conditions than a laser communication terminal on a remote platform. For example, it may be necessary to keep the cost of a near-earth returning terminal much lower than the cost of a laser communication terminal on a remote platform, because the platform costs per se are lower on the whole. In addition, such a system need not be designed for eight to fifteen years of maintenance-free operation through regular maintenance intervals. Thus, a relatively simple receiving segment or laser communication terminal may preferably be used, its efficiency is of secondary importance, because in general sufficient power and cooling capacity are available on a near-earth, returning platform.

In addition, it may be necessary to take into account the influence of the atmosphere on laser communication. Coherent reception may be impaired by lower strata of the atmosphere if the diameter of the turbulence cells in the line of sight between the two communication platforms is smaller than the reception aperture.

The so-called Fried parameter or the atmospheric correlation link may be used to measure atmospheric interference. This corresponds to the size of turbulence cells within which the mean quadratic error of the phase interference is 1 $rad^2$. It is generally known that a reception aperture should be smaller than the Fried parameter to enable coherent reception and/or, in the case of traditional astronomy, observation of stars without interference.

However, amplitude-modulated reception may be assumed to be insensitive to phase front interference. At the same time, the optical quality of the reception lenses may be reduced in comparison with coherent reception. This may result in a definite cost advantage for an amplitude-modulated receiver whose line of sight for reception crosses through the atmosphere.

Typically, the data transmission rate from the near-earth returning platform to a remote platform is many times greater than that from the remote platform to the near-earth returning platform. This may result from the fact that, for example, the near-earth returning platforms usually serve as local information collecting sources, for example, UAVs over crisis regions, and transmit their collected data to remote platforms that assume the function of a data relay node.

In addition, preferred embodiments of the system according to the invention for communication between the two communication platforms are described here.

According to another preferred embodiment of the present invention, the system may have a first partial communication link to a first type of modulation between the near-earth returning platform and the remote platform and thus from the near-earth returning platform to the remote platform, and a second partial communication link with a second type of modulation between the remote platform and the near-earth returning platform and thus from the remote platform to the near-earth returning platform, such that the first type of modulation is not the same as the second type of modulation.

According to another preferred embodiment of the present invention, the first and second types of modulation may each be a type of modulation from the group consisting of amplitude modulation and phase modulation. In particular the first type of modulation may be the phase modulation type of modulation and the second type of modulation may be the amplitude modulation type of modulation.

The use of different types of modulation for each partial communication link and thus for uplink and downlink between the communication platforms makes it possible to adjust the communication link to particular physical factor sand in particular to take into account the asymmetry of the transmission channel between the platforms.

According to another preferred embodiment of the present invention, the near-earth returning platform may be designed for performing a first transmission method and a first reception method, wherein the first transmission method is a heterodyne transition method and the first reception method is an amplitude modulation reception method, wherein the remote platform is configured to perform a second transmission method and a second reception method, wherein the second transmission method is an amplitude modulation transmission method and the second reception method is the heterodyne reception method.

According to another preferred embodiment of the present invention, the near-earth returning platform may have a first transmission electronic unit and a first reception electronic unit, and the remote platform may have a second transmission electronic unit and a second reception electronic unit. The first transmission electronic unit may be equipped for transmission using the first transmission method, while the first reception electronic unit may be equipped for reception using the first reception method; the second transmission electronic unit may be equipped for transmission using the second transmission method and the second reception electronic unit may be equipped for reception using the second reception method.

The different communication methods of the heterodyne method and of the amplitude modulation method may take into account an asymmetry of the data channel and/or communication channel between the platforms and in particular may also be adapted to further factors of the respective platform, for example, the available power and/or the required maintenance intervals.

According to another preferred embodiment of the present invention, the remote platform may also be configured to perform a third transmission method wherein the third transmission method may be a heterodyne transmission method for communication with another remote platform.

It is possible in this way to likewise design a communication link, in this case a bidirectional symmetrical communication link between two remote platforms. It is thus possible to establish a relay connection, for example, between these two remote platforms to connect a remote platform that is in turn connected to the near-earth returning platform, for direct communication with a ground station at a great distance in order to relay the data collected from the near-earth returning platform to this ground station.

According to another preferred embodiment of the present invention, the communication link may be an optical communication link, in particular as a laser communication link.

Such a communication link may represent a preferred interference-resistant and/or interference non-susceptible communication link that may implement an information transmission with a comparatively low energy use.

According to another preferred embodiment of the present invention, the near-earth returning platform and the remote platform may each have a laser communication terminal, wherein the laser communication terminal has a laser element embodied as a transmission element and an optical detector element embodied as a reception element.

The detector element may be, for example, an optical reception diode, which may more preferably be adapted to a certain transmission of the optical communication link. At least one optical element, for example, a transmission and/or reception telescope, which may be embodied as a shared element or as a separate element, may be arranged on the laser element and/or on the optical detector element.

Thus, at least in the case of the near-earth returning platform, different lenses may be used for the transmission and reception light. Furthermore, a camera element may be used as an acquisition detector and/or as a tracking detector, at least on the near-earth returning platform, to implement a stable communication link between the near-earth returning platform and the remote platform by position tracking of the other platform and by adjusting the local alignment with respect to same.

According to another preferred embodiment of the present invention, at least the near-earth returning platform or the remote platform may have a plurality of laser communication terminals.

This makes it possible, for example, to implement a plurality of communication links, in particular simultaneously, with one or more platforms. With respect to the remote platform, for example, this may be in a communication link with a near-earth returning platform and with another remote platform at the same time in order to serve as a relay station, for example, and to relay data received essentially instantaneously from the near-earth returning platform to the additional remote platform, for example.

According to another preferred embodiment of the present invention the near-earth returning platform may be a platform for operation in the earth's atmosphere, in particular an aircraft, such as an airplane, and the remote platform may be a platform for operation outside of the earth's atmosphere, in particular in a low earth orbit or a geostationary orbit, such as a satellite.

In addition, preferred embodiments of the method according to the invention for communication between a near-earth returning platform and a remote platform are described here.

According to another preferred embodiment of the present invention, the method may include communicating between the near-earth returning platform and the remote platform using a first partial communication link with a first type of modulation and communicating between the remote platform and the near-earth returning platform using a second partial communication link with a second type of modulation, wherein the first type of modulation is not the same as the second type of modulation. In addition, the first and second types of modulation may each be a type of modulation from the group consisting of amplitude modulation and phase modulation; in particular the first type of modulation may be the phase modulation type of modulation and the second type of modulation may be the amplitude modulation type of modulation.

BRIEF DESCRIPTION OF THE DRAWING FIGURES

Additional exemplary embodiments and advantages of the present invention are derived from the following description of the figures. In the various figures the same or similar elements are provided with the same or similar reference numeral.

Diagrams in the figures are schematic and are not drawn to scale but they may reflect qualitative size ratios.

DETAILED DESCRIPTION

Figure 1:
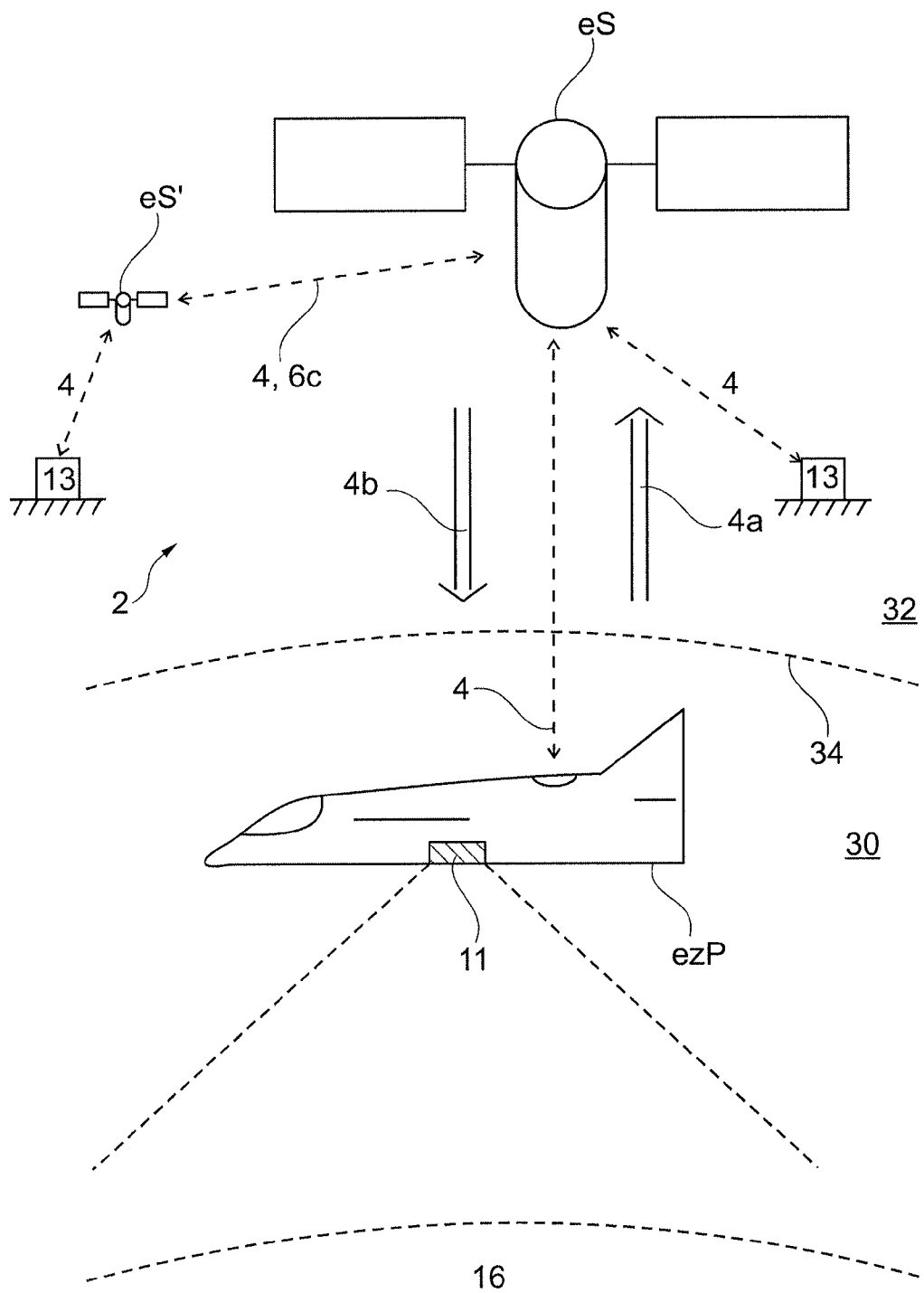
FIG. 1 shows a schematic overview of an exemplary embodiment of the communication system according to the invention.

FIG. 1 shows a schematic overview of an exemplary embodiment of the communication system according to the invention.

The near-earth returning platform ezP is embodied as an airplane as an example. Airplane ezP has a data receiving device 11 to receive, for example, ground photographs of a landscape of the earth 16. Airplane ezP is connected to a remote platform eS, for example, a geostationary satellite, using a communication link 4. An airplane ezP is within the earth's atmosphere 30, while satellite eS is in outer space 32 beyond the earth's atmosphere. The Kármán line 34 separates the atmosphere 30 and outer space 32 from one another according to the usual definition.

Examples shown here include a first partial communication link 4a as an uplink from airplane ezP to satellite eS as well as a second partial communication link 4b as a downlink from satellite eS to aircraft ezP is. Using the first partial communication link 4a, airplane ezP may relay data received with data receiving device 11 from earth 16 to the satellite eS. This information may be relayed from the satellite eS using communication link 4 to the ground station 13, which is only indicated schematically in FIG. 1. It is likewise conceivable that the satellite eS may relay the information to another satellite eS' using another communication link 4, while the latter is connected to a ground station 13 via communication link 4. The ground station 13 may in turn supply control and/or command data for the airplane ezP, which may be relayed from the satellite eS to the airplane ezP using the partial communication link 4b.

Figure 2:
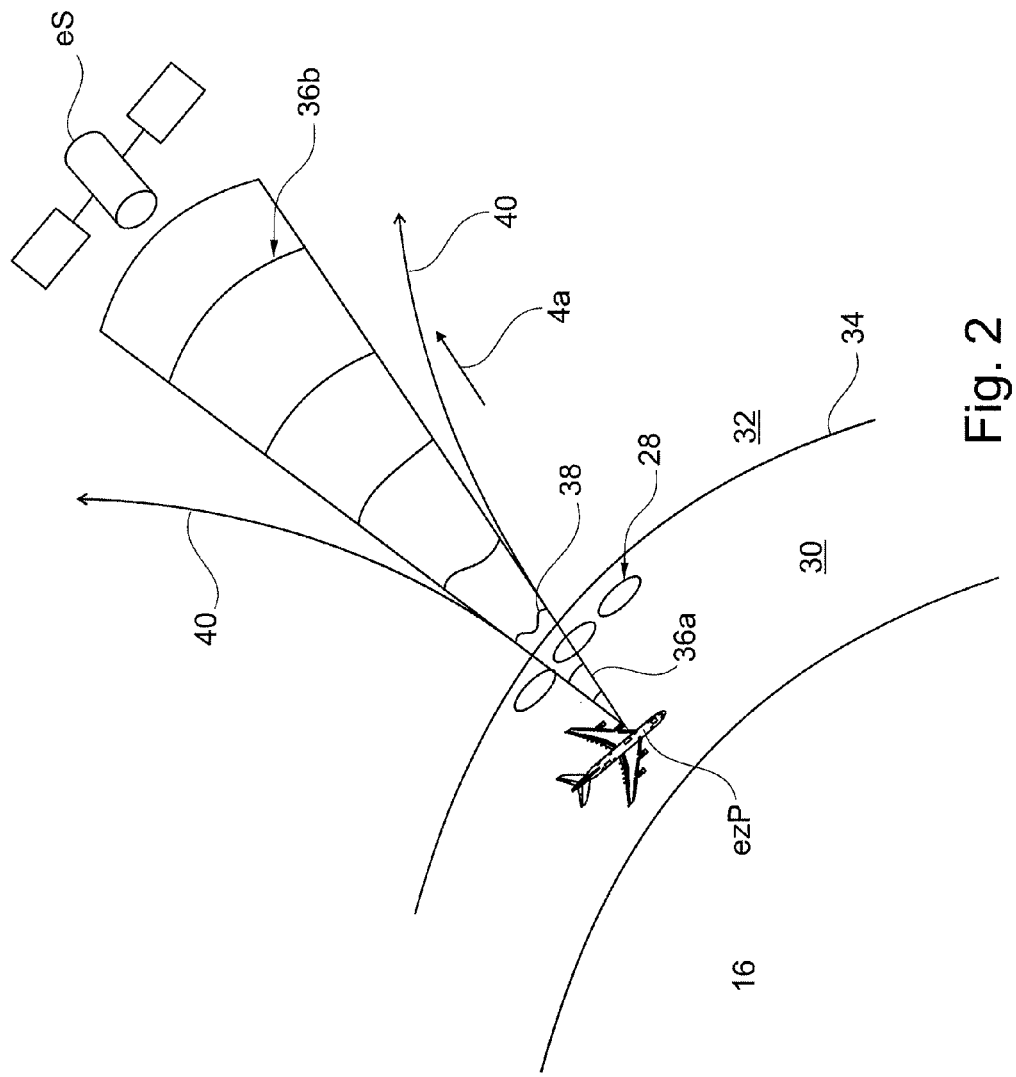
FIG. 2 shows a schematic diagram of the communication between ezP and eS according to the present invention.

With reference additionally to FIG. 2, a schematic diagram of the communication between ezP and eS according to the present invention is depicted.

Airplane ezP sends data by means of the uplink 4a to the satellite eS in FIG. 2. The communication link 4 used for this purpose may be a laser communication link, as previously indicated. An initially undisturbed phase front 36a may be converted into a phase front 38 with interference due to the turbulence cells 28 located in the vicinity of the airplane ezP in the atmosphere. An essentially undisturbed phase front 36b reaches the satellite eS, because this interference in the phase front 38 is deflected out of the partial communication link 4a due to deflection 40 in the area of outer space 32. This undisturbed phase front 36b is in turn suitable for coherent reception, for example, using the homodyne optical heterodyne reception with phase modulation.

Optical heterodyne reception resembles the principle of heterodyne reception, which is very widely used in radio technology, in which the reception signal is superimposed on the receiver end on a laser situated in the receiver, the frequency of this laser being in a fixed relationship to the frequency of the reception light. In homodyne reception this is the same frequency.

The deflection is represented like the Huygen principle. The smaller the space assumed by a disturbance in the wavefront, the greater the divergence of the resulting diffraction figure, resembling a diffraction at the gap. The smaller this gap, the greater the diffraction pattern.

With additional reference to FIG. 3, a schematic diagram of communication between the satellite eS and the airplane ezP according to the present invention will be discussed.

Figure 3:
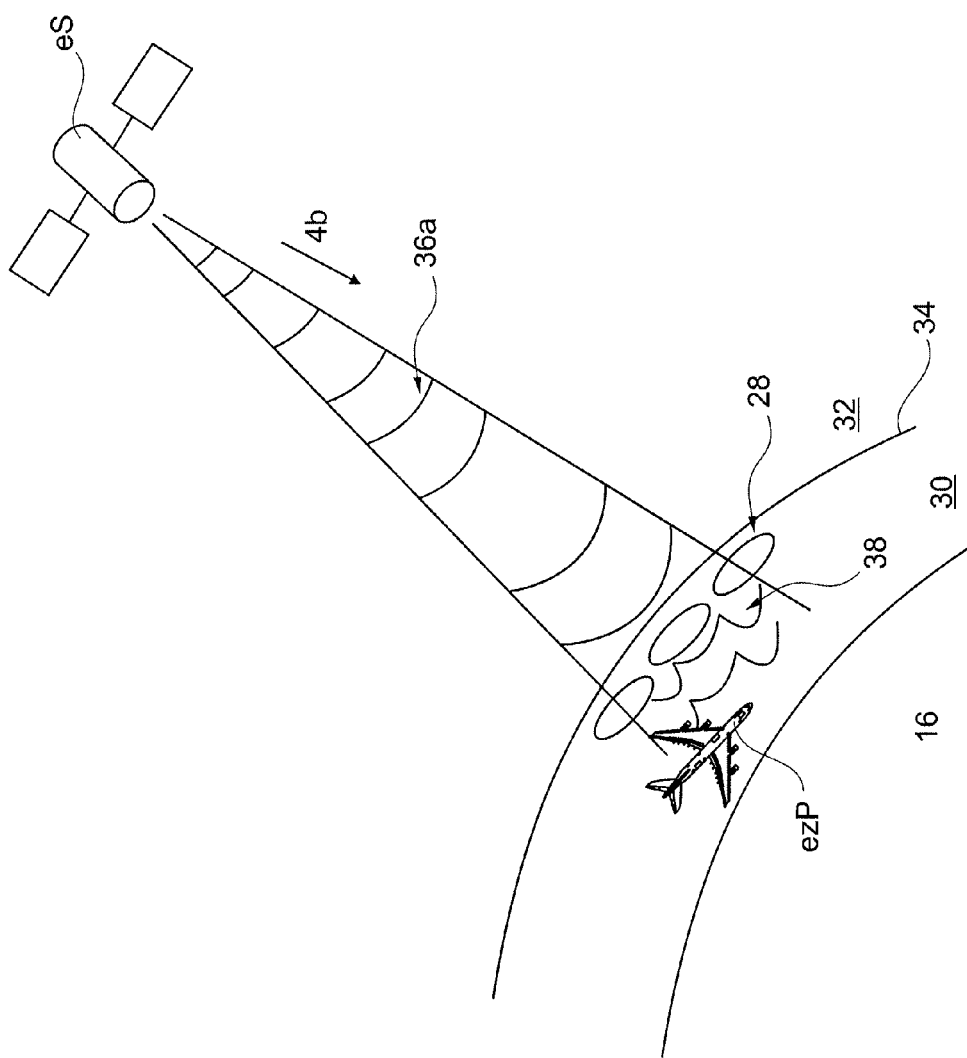
FIG. 3 shows a schematic diagram of communication between eS and ezP according to the present invention.

FIG. 3 shows the inverse behavior of the communication system 2 with the partial communication link 4b, i.e., the downlink of the data transmission from the satellite eS to the airplane ezP, in comparison with FIG. 2.

The phase fronts 36a emanating from the satellite eS first pass through outer space 32 essentially without interference but then after crossing the Kármán line 34 into the atmosphere 30 they encounter turbulence cells 28. These turbulence cells result in interference for the phase front 38. Since no comparable effects, for example, a deflection occurs in the scenario according to FIG. 3, the disturbed phase front 38 strikes the receiver element on board the airplane ezP. Since a disturbed phase front 38 is now arriving there, it is not suitable for a coherent reception process and may therefore require a different reception method, for example, an amplitude modulation reception method according to the present invention.

Figure 4:
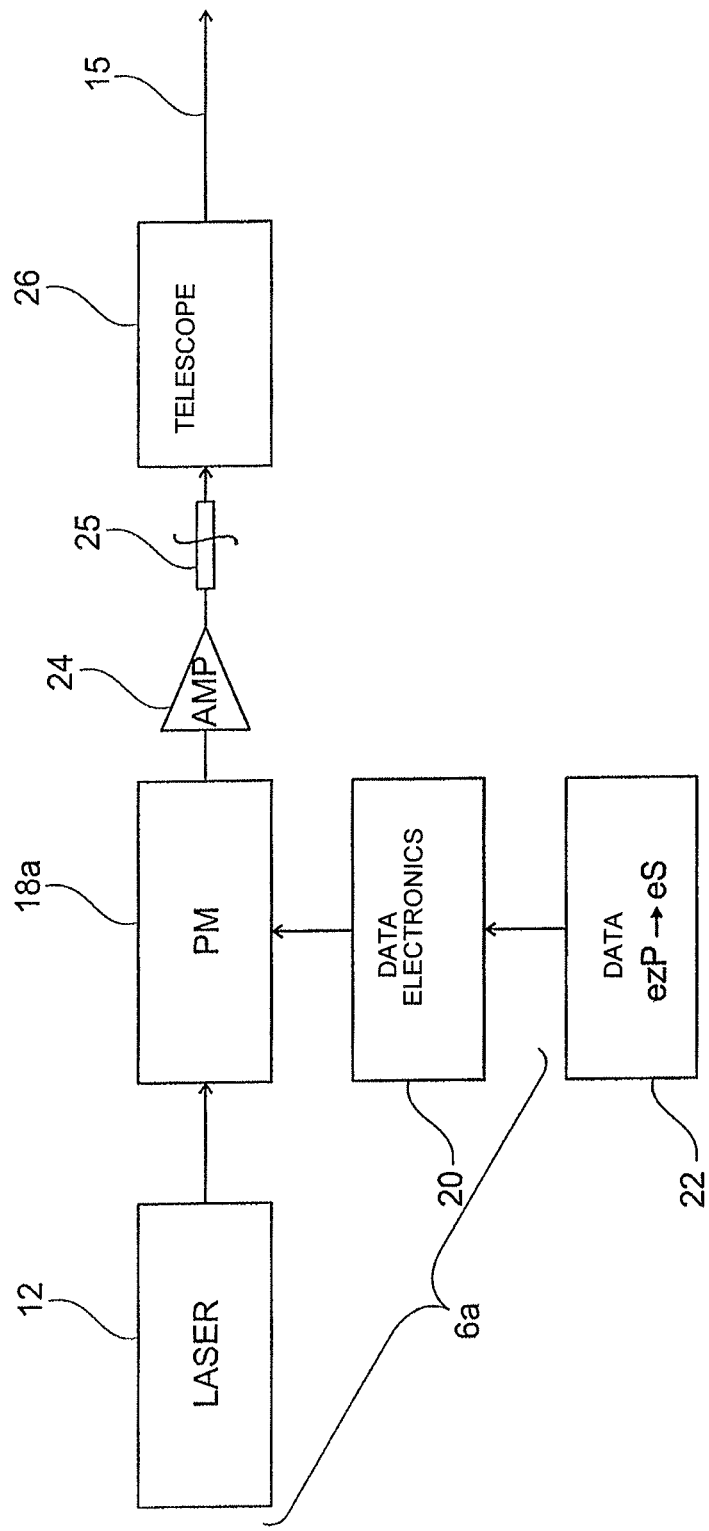
FIG. 4 shows a schematic diagram of the transmission unit of ezP according to the present invention.

With reference additionally to FIG. 4, a schematic diagram of the transmission unit of the ezP according to the present invention is depicted.

The laser element 12, phase modulator 18b and data electronic unit 20 are the elements which together constitute the first transmission electronic unit 6a. Laser element 12 is provided for implementation of the laser communication between the two platforms and supplies laser light as a data carrier. Data 22 that is to be transmitted from the airplane ezP to the satellite eS is prepared for the transmission by using a data electronic unit 20, e.g., is preprocessed, partially analyzed and/or digitized. Using phase modulation, the modulation element 18a modulates the data supplied by the data electronic unit 20 to the carrier supplied by the laser element 12. The resulting data laser beam may be boosted by amplifier 24 and bundled by the optical element of telescope 26 and/or directed at the receiver platform eS. Between the amplifier 24 and the telescope 26, there may be a transmission through optical wave guides 25, for example, for implementation of a simple connection.

Figure 5:
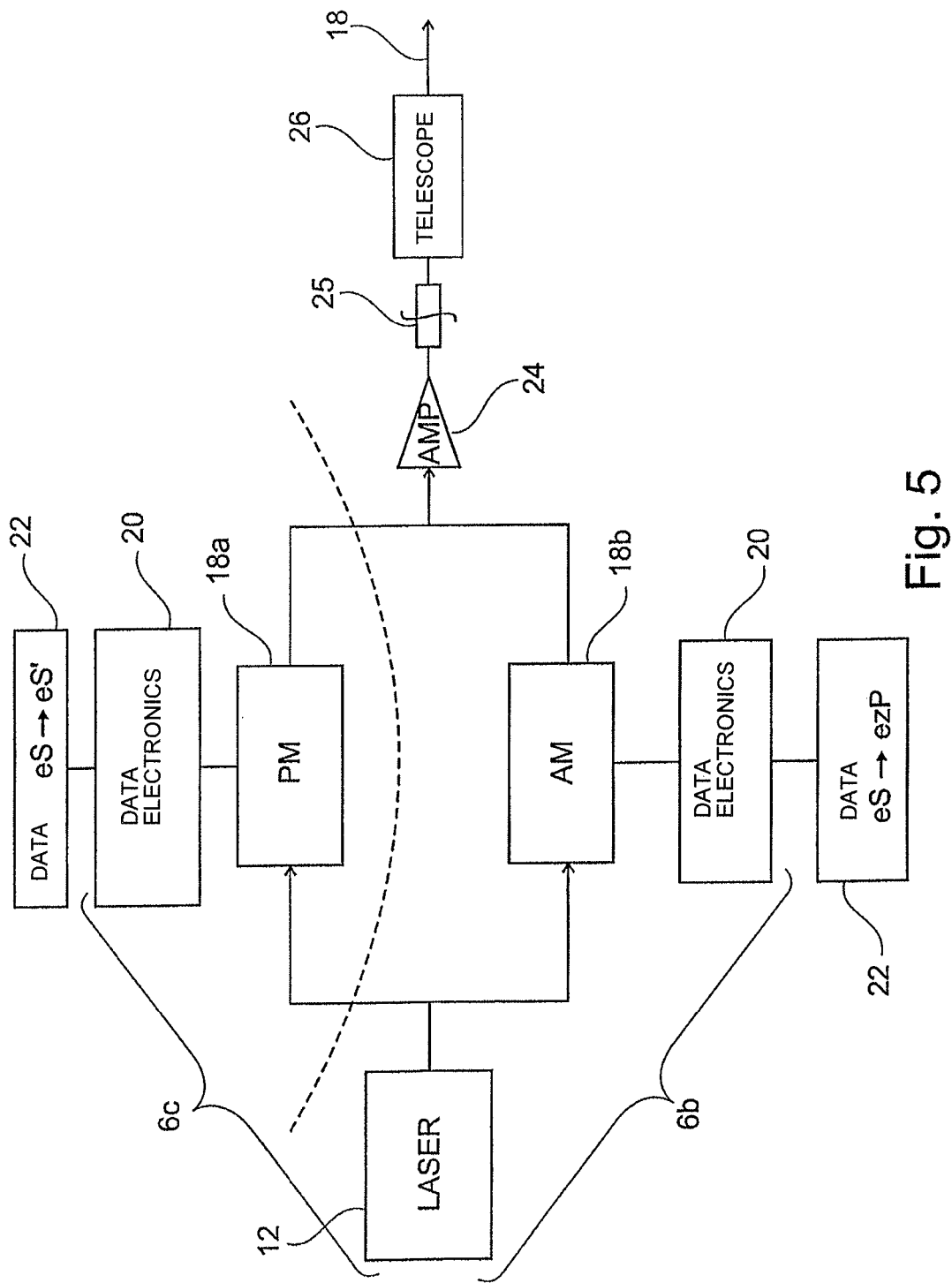
FIG. 5 shows a schematic diagram of the transmission unit of eS according to the present invention.

With reference additionally to FIG. 5, a schematic diagram of the transmission unit of the eS according to the present invention is depicted.

The transmission unit 6b of the satellite eS according to FIG. 5 differs from the transmission unit 6a of the airplane ezP essentially in that first an amplitude modulation element 18b is provided instead of the phase modulation element 18a. The laser element 12, amplitude modulator 18b and data electronic unit 20 here represent the second transmission electronic unit 6b. Data 22 that is to be sent from the satellite eS to the airplane ezP is modulated onto the carrier signal of laser element 12 by modulator element 18b. Data electronic unit 20 here again represents an adaptation and/or processing of the data for modulation by modulation element 18b. The second transmission electronic unit 6b is sufficient in this context in the event that satellite eS is supposed to communicate explicitly with the airplane ezP.

In the event that the satellite eS is to communicate with another satellite eS', a third transmission electronic unit 6c, which is essentially comparable to the first transmission electronic unit 6a of the airplane ezP, is provided. The second transmission electronic unit 6b and the third transmission electronic unit 6c are arranged here so they are functionally in parallel. In an actual implementation of the transmission unit of the satellite eS, however, the two modulator elements 18a, b may be arranged serially, e.g., in the course of the same fiber. Switching between amplitude modulation and phase modulation is performed here by suspending the control of the respective modulator element that is not needed because a modulator element that is not being controlled has a neutral behavior, i.e., it is more or less nonexistent.

In the full expansion stage with a second transmission electronic unit 6b and a third transmission electronic 6c, the satellite eS may thus communicate with an airplane ezP as well as with another satellite eS', in particular at the same time, and may function here as a relay station. For example, a data stream from satellite eS received by the airplane eS may be relayed directly to another satellite eS'.

Figure 6:
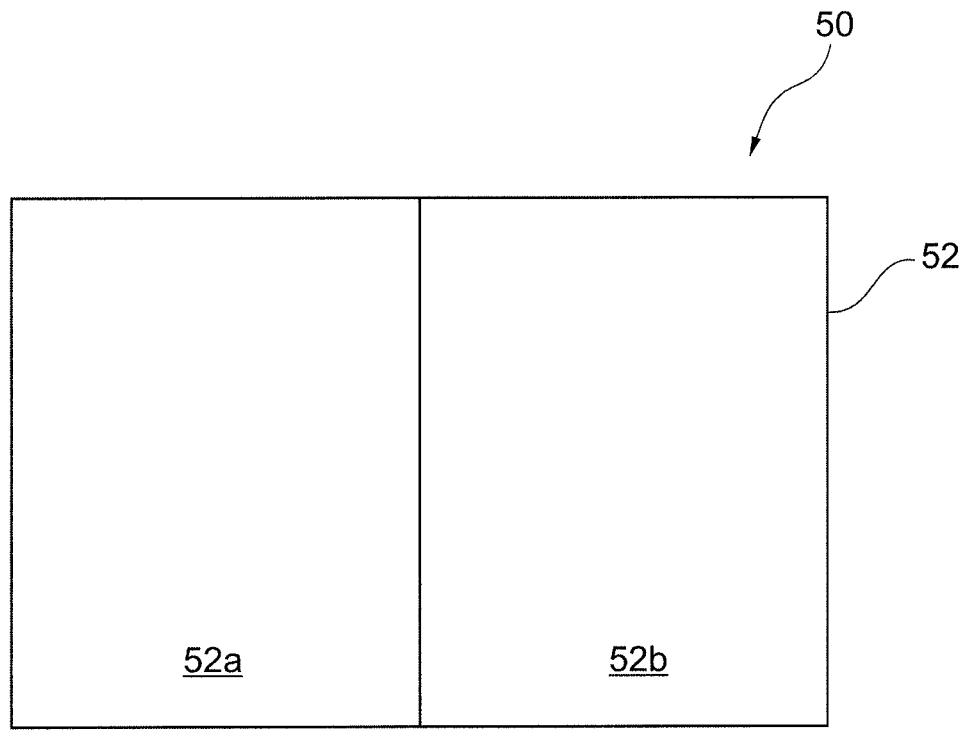
FIG. 6 shows an exemplary diagram of the method according to the invention for communication between an ezP and an eS according to the present invention.

With reference additionally to FIG. 6, an exemplary diagram of the method according to the invention for communication between a near-earth returning platform ezP and a remote platform eS according to the present invention is depicted.

Method 50 for communication between a near-earth returning platform and a remote platform has the steps of communication 52 between the near-earth returning platform and the remote platform and uses a bidirectional asymmetrical communication link to do so.

Communication 52 here is divided into communication 52a between the near-earth returning platform and the remote platform using a first partial communication link with a first type of modulation and communication 52b between the remote platform and the near-earth returning platform using a second partial communication link having a second type of modulation, wherein the first type of modulation is not the same as the second type of modulation.

Furthermore, it should be pointed out that "having" or "comprising" are terms that do not exclude other elements or steps, and that "one" or "a(n)" does not preclude a plurality. It should also be pointed out that features or steps which are described with reference to any of the exemplary embodiments or implementations mentioned above may also be used in combination with other features or steps of other exemplary embodiments or implementations described above. Reference notation in the claims is not to be regarded as a restriction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NOTATION 2 system
ezP near-earth returning platform/airplane
eS, eS' remote platform/satellite
4 communication link
4a, b first, second partial communication links/uplink, downlink 6a, b, c first, second, third transmission electronic unit
8a, b first, second reception electronic unit
10 laser communication terminal
11 data recording device
12 laser element
13 ground station
15 laser beam
16 earth
18a, b modulator element
20 data electronic unit
22 data
24 amplifier
25 optical fiber
26 optical element/telescope
28 turbulence cell
30 atmosphere
32 outer space
34 Kármán line
36 phase front
38 phase front after disturbance
40 deflection
50 method for communication between a near-earth returning platform and a remote platform
52 STEP: communication
52a STEP: communication with a first type of modulation
52b STEP: communication with a second type of modulation

What is claimed is:

1. A system for communication between two communication platforms, comprising:
   a near-earth returning platform including a laser and a heterodyne modulator coupled to the laser, wherein the heterodyne modulator is configured to modulate laser light received from the laser according to a heterodyne modulation; and
   a remote platform including a laser and an amplitude modulator coupled to the laser, wherein the amplitude modulator is configured to modulate laser light received from the laser according to an amplitude modulation; and
   a bidirectional asymmetrical communication link that couples the near-earth returning platform and the remote platform, wherein the bidirectional asymmetrical communication link includes an uplink communication link from the near-earth returning platform to the remote platform carrying heterodyne modulated signals and a downlink communication link from the remote platform to the near-earth returning platform carrying amplitude modulated signals.

2. The system according to claim 1, wherein the communication link is an optical communication link.

3. The system according to claim 2, wherein the optical communication link is a laser communication link.

4. The system according to claim 3, wherein at least one of the near-earth returning platform or the remote platform has a plurality of lasers.

5. The system according to claim 1,
   wherein the near-earth returning platform is a platform operating in the earth's atmosphere, in particular an aircraft, more specifically an airplane, or
   wherein the remote platform is a platform operating outside of the earth's atmosphere, in particular in a low earth orbit or in a geostationary orbit, more specifically a satellite.

6. The system according to claim 5,
   wherein the near-earth returning platform is in an airplane, or
   wherein the remote platform is in a low earth orbit or in a geostationary orbit satellite.

7. The system of claim 1, wherein the near-earth returning platform is an aircraft located in the earth's atmosphere and the remote platform is a satellite located outside of the earth's atmosphere.

8. The system of claim 7, wherein a transmission rate of the uplink communication link is a multiple of a transmission rate of the downlink communication link, wherein the multiple is greater than one.

9. The system of claim 8, wherein a power of the laser of the near-earth returning platform is a multiple of a power of the laser of the remote platform, wherein the multiple is greater than one.

10. A system for communication between two communication platforms, comprising:
    a near-earth returning platform; and
    a remote platform; and
    a bidirectional asymmetrical communication link that couples the near-earth returning platform and the remote platform,
    wherein the near-earth returning platform is configured to implement a first transmission technique and a first reception technique;
    wherein the first transmission technique is a heterodyne transmission technique, and the first reception technique is an amplitude modulation reception technique;
    wherein the remote platform is configured to implement a second transmission technique and a second reception technique;
    wherein the second transmission technique is an amplitude modulation transmission technique and the second reception technique is a heterodyne reception technique.

11. The system according to claim 10,
    wherein the near-earth returning platform has a first transmission electronic unit and a first reception electronic unit; and
    the remote platform has a second transmission electronic unit and a second reception electronic unit,
    wherein the first transmission electronic unit is configured to transmit using the first transmission technique,
    wherein the first reception electronic unit is configured to receive using the first reception technique;
    wherein the second transmission electronic unit is to transmit using the second technique, and
    wherein the second reception electronic unit is configured to receive using the second reception technique.

12. The system according to claim 11,
    wherein the remote platform is further configured to implement a third transmission technique, and
    wherein the third transmission technique is a heterodyne transmission technique for communication with another remote platform.

13. The system of claim 10, wherein the near-earth returning platform is an aircraft located in the earth's atmosphere and the remote platform is a satellite located outside of the earth's atmosphere.

14. The system of claim 13, wherein the first transmission technique produces a data rate that is a multiple of the second transmission technique, wherein the multiple is greater than one.

15. A method for communication between a near-earth returning platform and a remote platform, comprising:
   establishing a bidirectional asymmetrical communication link between the near-earth return platform and the remote platform; and
   communicating between the near-earth return platform and the remote platform over the bidirectional asymmetrical communication link, wherein the bidirectional asymmetrical communication link includes an uplink communication link from the near-earth returning platform to the remote platform carrying heterodyne modulated signals and a downlink communication link from the remote platform to the near-earth returning platform carrying amplitude modulate signals.

16. The method of claim 15, wherein the near-earth returning platform is an aircraft located in the earth's atmosphere and the remote platform is a satellite located outside of the earth's atmosphere.

17. The method of claim 16, wherein a transmission rate of the uplink communication link is a multiple of a transmission rate of the downlink communication link, wherein the multiple is greater than one.

18. The system of claim 17, wherein a power of the laser of the near-earth returning platform is a multiple of a power of the laser of the remote platform, wherein the multiple is greater than one.

* * * * *